March 17, 1925.
J. W. COLLINS
1,530,237
BURNER HOLDING MEANS FOR GLASS LAMPS
Filed June 4, 1924
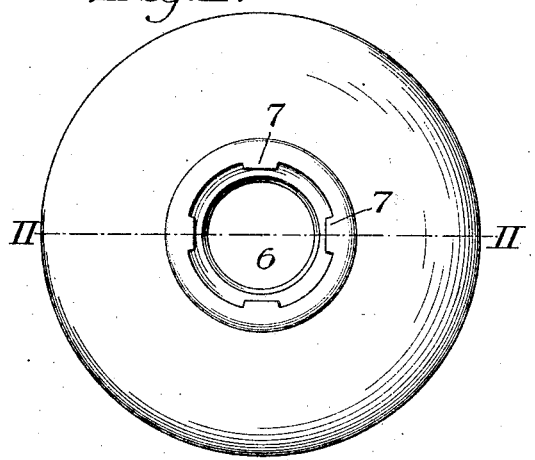
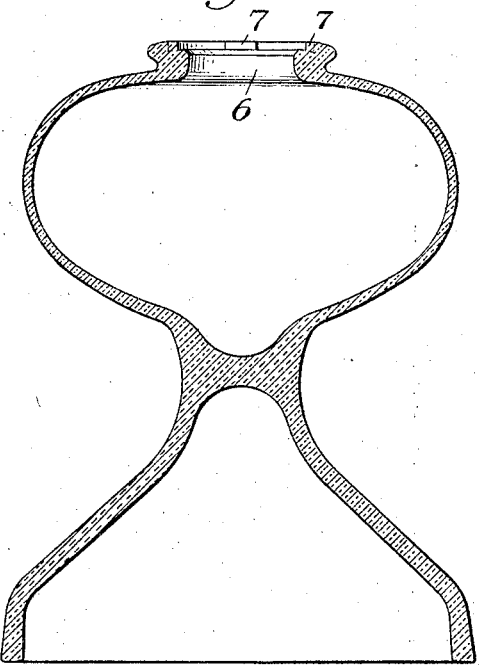
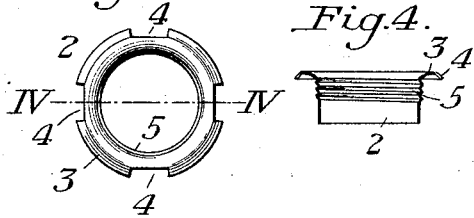
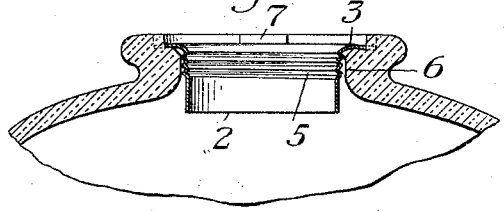
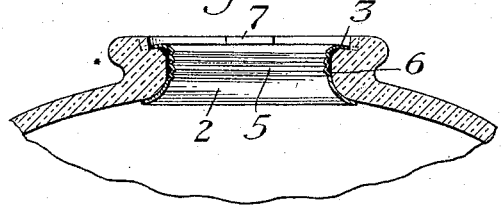
INVENTOR
James W. Collins,
by Byrnes, Stebbins & Parmelee
His Attys.

Patented Mar. 17, 1925.

1,530,237

UNITED STATES PATENT OFFICE.

JAMES W. COLLINS, OF SAPULPA, OKLAHOMA, ASSIGNOR TO THE BARTLETT-COLLINS GLASS COMPANY, OF SAPULPA, OKLAHOMA, A CORPORATION OF OKLAHOMA.

BURNER-HOLDING MEANS FOR GLASS LAMPS.

Application filed June 4, 1924. Serial No. 717,734.

*To all whom it may concern:*

Be it known that I, JAMES W. COLLINS, a citizen of the United States, residing at Sapulpa, county of Creek, and State of Oklahoma, have invented a new and useful Improvement in Burner-Holding Means for Glass Lamps, of which the following is a full, clear, and exact description.

This invention relates to glass lamps, and particularly to burner-holding means therefor and to a method of permanently associating such means with the neck portion of a lamp after the latter has been formed.

The invention is illustrated in the accompanying drawings, in which,—

Figure 1 is a plan view of a lamp having its neck portion formed to receive a preferred form of my burner-holding means;

Figure 2 is a vertical section on the line II—II of Figure 1;

Figure 3 is a plan view of a preferred form of burner-holding means;

Figure 4 is a vertical section on the line IV—IV of Figure 3, and

Figures 5 and 6 are sectional views, on a larger scale, through the neck portion of the lamp, illustrating the steps in permanently associating the holding means shown in Figures 3 and 4 with such neck portion.

One method of providing the neck portion of a glass lamp with burner-holding means, which is employed to a considerable extent at the present time, consists in supporting a burner-holding device in a mold and casting the neck of the lamp around the device simultaneously with the pressing and shaping of the body portion of the lamp in the press mold. The principal objection to this method is that the glass is pressed when hot around the burner-holding device, and when the glass cools it shrinks, causing a strain that frequently breaks the glass around the burner-holding device. By my present invention I avoid this difficulty by securing the burning-holding device in the neck orifice when the glass is cold.

A preferred form of burner-holding device is illustrated in Figures 3 and 4, and consists of a metal bushing 2 having a flange 3 at its upper end provided with a plurality of notches 4 therein. The upper portion of the bushing is provided with a burner-engaging thread 5, leaving an unthreaded portion below the thread. The neck of the lamp is preferably formed, as shown in Figures 1 and 2, with a countersunk orifice 6 having a plurality of lugs 7 extending into the countersunk space.

To permanently associate the burner-holding device shown in Figures 3 and 4 with the neck portion of the lamp, the bushing is preferably first coated on its outer surface with cement and the bushing then inserted in the neck orifice in such position that the lugs 7 extend into the notches 4 in the flange 3. Then by means of a suitable tool, the lower end portion of the bushing is peened outwardly into engagement with the under surface of the neck portion of the lamp, as shown in Figure 6. The bushing is thus held securely in the neck orifice, and the cooperation of the lugs 7 with the notches 4 effectively prevents turning of the bushing. The cement fills the space between the neck and the bushing and prevents leakage.

While I have illustrated and described a preferred embodiment of my invention, it will be understood that the invention may be otherwise embodied within the scope of the appended claims.

I claim:

1. A glass lamp having a neck portion provided with a countersunk orifice adapted to receive a burner-holding device, said neck portion having an integral lug projecting into the countersunk space, and a metal bushing cemented in said orifice and having a flange at its outer end engaging the countersunk surface of said neck portion and having a flange at its inner end engaging the inner surface of said neck portion, the flange at the outer end of said bushing having a notch receiving said lug and said bushing having a burner-engaging thread, substantially as described.

2. A glass lamp having a neck portion provided with a counter-sunk orifice adapted to receive a burner-holding device, said neck portion having an integral lug projecting into the counter-sunk space, and a metal bushing in said orifice having a flange at its outer end engaging the counter-sunk surface of said neck portion and having a flange at its inner end engaging the inner surface of said neck portion, the flange at the outer end of said bushing having a recess receiving said lug and said bushing having a burner-engaging thread, substantially as described.

In testimony whereof I have hereunto set my hand.

JAMES W. COLLINS.